United States Patent
Larin

(10) Patent No.: US 7,403,858 B2
(45) Date of Patent: Jul. 22, 2008

(54) METHOD FOR DETECTING AN OCCURRENCE ZONE OF A MANTLE DIAPIR FINGER LOCATION

(75) Inventor: Vladimir Nikolaevich Larin, ul. Kuusinena, 4/6-B-63, Moscow (RU) 123308

(73) Assignees: Vladimir Nikolaevich Larin, Moscow (RU); Nikolai Vladimirovich Larin, Moscow (RU)

( * ) Notice: Subject to any disclaimer, the term of this patent is extended or adjusted under 35 U.S.C. 154(b) by 0 days.

(21) Appl. No.: 11/575,480

(22) PCT Filed: Mar. 15, 2005

(86) PCT No.: PCT/RU2005/000114

§ 371 (c)(1),
(2), (4) Date: Mar. 16, 2007

(87) PCT Pub. No.: WO2006/043852

PCT Pub. Date: Apr. 27, 2006

(65) Prior Publication Data
US 2007/0213937 A1    Sep. 13, 2007

(30) Foreign Application Priority Data
Oct. 22, 2004    (RU) .............................. 2004130955

(51) Int. Cl.
*G01V 1/00* (2006.01)
*G01V 3/00* (2006.01)
*B01D 53/02* (2006.01)
(52) U.S. Cl. .............................. 702/14; 324/350; 95/82
(58) Field of Classification Search ............. 702/14, 702/1, 11, 15, 22–25; 324/350; 95/82; 73/19.01, 73/19.02, 23.22, 23.35
See application file for complete search history.

(56) References Cited

U.S. PATENT DOCUMENTS 6,430,507 B1    8/2002    Jorgensen

FOREIGN PATENT DOCUMENTS

RU    2226283 C1    3/2004

OTHER PUBLICATIONS

Wakita et al., "Helium Spots": Caused by a Diapiric Magma from the Upper Mantle, Apr. 28, 1978, Science, vol. 200, pp. 430-432.*

(Continued)

*Primary Examiner*—John Barlow
*Assistant Examiner*—Toan M. Le
(74) *Attorney, Agent, or Firm*—Abelman, Frayne & Schwab

(57) ABSTRACT

The invention covers the mining industry. Detection method of the occurrence zone of the mantle substance diapir finger consisting in that that geological observation are carried out in riftzones banked up by diapirs of the abnormal mantle and places of location of the mantle substance finger in the earth's crust are determined. Based on the presence of influence traces of silanes streams upon the rock and/or presence of separate ridges having the length up to 200 km by the width of up to 20 km and/or based on the blast traces of silanes and/or presence of scoria cones, differing by that that the correspondence of $^3He/^4He$ from gases sampled from sources of $10^{-5}$ order is additionally determined for determination of silicides at the small depth as physical parameters for the location of the mantle substance diapir finger in the earth's crust. The presence of high semiconductor conductivity, locality and activity of magnetic anomalies and anomalies of gravity field is additionally established. The occurrence depth of silicides is determined by magnetotelluric sounding and/or seismic reflection and refraction methods.

20 Claims, 2 Drawing Sheets

OTHER PUBLICATIONS

Sakamoto et al., 3He/4He Ratio Distribution in and Around the Hakone Volcano, 1992, Geochemical Journal, vol. 26, pp. 189-195.*

Polyak, B.G., Helium Isotopes in Subsurface Fluids from the Baikal Rift Zone: An Application to the Problems of Geodynamics, 2002, Geofisica International, vol. 41, No. 4, pp. 485-490.*

Fujiwara et al., Bathymetry and Magnetic Anomalies in the Havre Trough and Southern Lau Basin: from Rifting to Spreading in Back-Arc Basins, 2001, Earth and Planetary Science Letters 185, pp. 253-264.*

Mankinen et al., "Gravity and Magnetic Study of the Pahute Mesa and Oasis Valley Region, Nye County, Nevada", USGS, Open-File Report 99-303, Version 1.0, 1999.

Rodriguez et al., "Deep Regional Resistivity Structure Across the Battle Mountain-Eureka and Carlin Trends, North-Central Nevada", USGS, Open-File Report 01-346, On-line edition, 2001.

International Search Report for the present application PCT/RU2005/000114, dated Jul. 25, 2005.

* cited by examiner

METHOD FOR DETECTING AN OCCURRENCE ZONE OF A MANTLE DIAPIR FINGER LOCATION

CROSS-REFERENCE TO RELATED APPLICATIONS

This application is a 371 of international application number PCT/RU2005/000114, filed on Mar. 15, 2005.

BACKGROUND OF THE INVENTION

1. Field of the Invention

The invention covers the mining industry and can be used by ore underground mining, in particular, for mining metallic deposits including native metals. This invention relates to a method for detection of an occurrence zone of a diapir finger, a mantle substance saturated with native metals.

2. Description of the Related Art

Rifting zones exist on our planet. These zones are located in the oceans (mid-ocean ridges, Iceland), on the continents (Baikal, Africa, Jordan river—Dead Sea, Suez, Western Canada et al.) and under the continents (west of USA).

All riftzones are banked up by diapirs (brows) of the abnormal mantle from below. Diapirs go up to the depth of about 35 km under the continents and at a distance of about 1.5 km from the bed of rift valleys in the oceans. Diapirs are characterized by reduced density and rates of the transmission of seismic waves as compared with a normal mantle.

In some places the diapirs penetrate by their "fingers" from the 35 km depth into the overlying rocks up to the depth of approximately 3-10 km. The "fingers" outgoing from diapirs have abnormal conductivity ($10^5$-$10^6$ times as much as the conductivity of silicate rock) and are represented by intermetallic compounds (silicides) and alloys on the basis of Si, Mg, Fe (silicon, magnesium and iron).

The reaching of fingers by any up-to-date methods (drilling, underground opening, open cut drilling) will allow for mining of native metals. Traditionally, the metals are obtained from compounds (oxides, sulfides and other) with large power inputs necessary for breaking the molecular bonds of the compounds.

In this case it is essential to locate a mining place, i.e. to detect the location of a diapir finger containing silicides and alloys. This place can be determined taking into account trendlike properties inherent in diapir fingers of the mantle substance.

A method for detection of zones in the earth's crust possessing an increased conductivity (magnetotelluric sounding method) is known. Example: "DEEP REGIONAL RESISTIVITY STRUCTURE ACROSS THE BATTLE MOUNTAIN—EUREKA AND CARLIN TRENDS, NORTH-CENTRAL NEVADA" by Brian D. Rodriguez and Jackie M. Williams, Open-File Report 01-346 on-line edition, 2001.

The disadvantage of this method is expressed in the fact that the abnormal conductivity is traditionally related to the presence of graphitization zones and/or hydrothermal solutions but not to the presence of fingers of intermetallic diapirs by interpretation of data obtained by use of this method.

A method for detection of blocks in the earth's crust possessing increased rates of seismic waves (reflection method) is known by the Consortium for Continental Reflection Profiling (COCORP).

The disadvantage of this method is expressed in the fact that the high velocity blocks are not related to the presence of silicide diapirs in the higher levels of the earth's crust by interpretation of data obtained by use of this method.

The methods for detection of blocks in the earth's crust characterized by locality and high activity of magnetic anomalies and low-amplitude anomalies of a gravity field (gravimetry and magnetometry) are known. Example: "Gravity and Magnetic Study of the Pahute Mesa and Oasis Valley Region, Nye County, Nevada" by Edward A. Mankinen, Thomas G. Hildenbrand, Gary L. Dixon, Edwin H. McKee, Christopher J. Fridrich, and Randell J. Laczniak, Open-File Report 99-303.

The disadvantage of these methods is expressed in the fact that active magnetic anomalies are not related to a transitional area from silicides to silicates in apical parts of silicide diapirs, and anomalies of a gravity field are not related to the presence of silicides by interpretation of data obtained by use of these methods.

SUMMARY OF THE INVENTION

This invention is focused on the solving of a technical task to ensure measurement reliability with use of features of physical and chemical interaction with the environment.

The technical result reached by this invention includes the time reduction of prospecting works and an increase of reliability of the information obtained.

The mentioned technical result can be reached according to the detection method of the present invention for detecting an occurrence zone of the mantle substance diapir finger including having a geological observation carried out in riftzones banked up by diapirs of the abnormal mantle, and places of location of the mantle substance finger in the earth's crust are determined based on the presence of influence traces of streams of silanes upon the rock and/or presence of separate ridges having a length up to 200 km by a width of up to 20 km and/or based on the blast traces of silanes and/or presence of scoria cones, and the correspondence of $^3He/^4He$ from gases sampled from sources on the order of $10^{-5}$ is additionally determined for determination of silicides at a small depth as physical parameters for the location of the mantle substance diapir finger in the earth's crust.

Furthermore, the presence of high semiconductor conductivity, locality and activity of magnetic anomalies and anomalies of a gravity field is established, and seismic reflection and refraction methods are applied for reliability concretization of the obtained result. At that, the occurrence depth of silicides is determined using a combination of geophysical methods, e.g. magnetotelluric sounding (MT) and seismic reflection and refraction methods. The magnetotelluric sounding will show the position of an object with high conductivity, and the reflection method will show the limits of the high velocity block in the higher levels of the earth's structure, and the refraction method will show the velocity distribution inside of this block.

The mentioned features are essential and interconnected with the formation of a stable totality of critical limitations being sufficient for the obtaining of the required technical result.

DETAILED DESCRIPTION OF THE INVENTION

Figure 1:
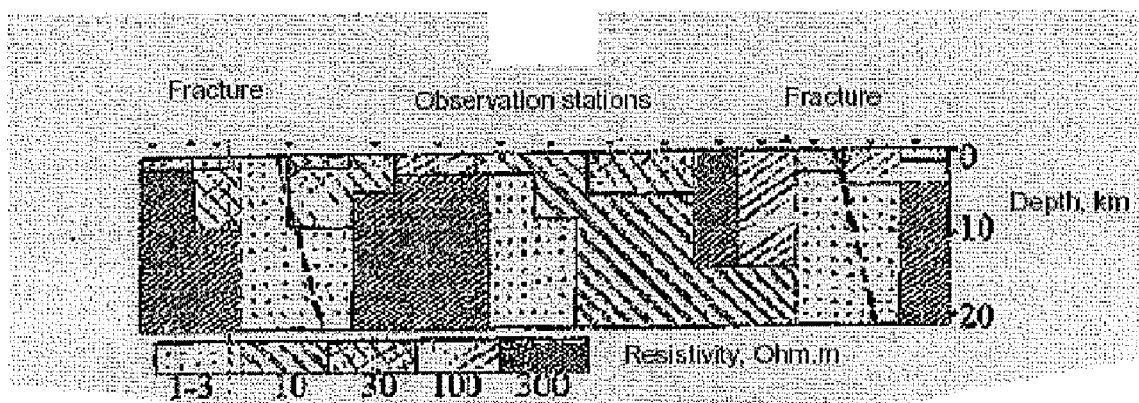
FIG. 1 is a sectional drawing with an indication of sections with various conductivity.

The present invention is related to international application number PCT/RU2005/000114, filed on Mar. 15, 2005, which is incorporated herein by reference in its entirety.

This method is based on the analysis and results of practical work as result of which the following is proved:

Features inherent in the mantle substance fingers:
1. They must be located within the riftzone,
2. They must have abnormal conductivity.
3. They must be represented by intermetallic compounds (silicides) and alloys.
4. They must give off hot hydrogen by reaction with water.
5. Helium isotopy. Ratio of $^3He/^4He$ on the order of $10^{-5}$ is likely (i.e. "mantle ratio"), for comparison: a ratio of $^3He/^4He$ on the order of $10^{-8}$ is typical for crust rock.
6. Hydrogen streams are possible.
7. Silane streams (e.g. $SiH_4$) or traces of their influence upon the bearing strata are possible.
8. The presence of abnormally low thermal current is possible both in the Tunka cavity located in the Baikal riftzone and in Ridge and Basin Areas in the west of the USA. This is connected with the impossibility of water penetration to the apical parts of fingers, at that, this is obviously caused by permafrost in the Baikal riftzone and by extremely low precipitation (a few millimeters per year) in the west of the USA. The reaction with heat release occurs in the riftzones where water can penetrate up to the fingers of the abnormal mantle and, as a consequence, the thermal current over the riftzone will be increased.

At present the mine of Western Deep Levels (deposit Witwatersrand, the Republic of South Africa) has the record depth of 3800 m. The depth limit for the mines is the high temperature of enveloping rock, so the temperature of the enveloping rock at the depth of 4 km may reach 100° by a gradient of about 25°/km. By the presence of an abnormally low thermal current, as described herein, of about 2°/km (north Transbaikalia) the temperature increase will not prevent the putting-down of the mine.

Signs of presence of silicides at the small depth.
1. Helium isotopy, such that a ratio $^3He/^4He$ must be at the level on the order of $10^{-5}$. The mantle is characterized by the abovementioned ratio. So, the mantle diapirs must also comply with the ratio on the order of $^3He/^4He$ of $10^{-5}$.

The isotope ratio of helium is determined according to the following method:

It is necessary to find sources or reservoirs on the target territory where gas bubbles are present.

It is necessary to collect these bubbles. A funnel and a glass bottle with the rubber stopper are usually used for this purpose.

A sample must be marked and sent to a special-purpose laboratory for analysis (e.g. for mass spectrometry).

The laboratory will issue results in the form of a ratio of $^3He/^4He$. The results obtained from the laboratory must be analyzed.

2. Abnormally high conductivity (semiconductor, not much and not less). It is conditioned in that phases of $Mg_2Si$, FeSi and Si are semiconductors.

The rock conductivity at the depths of up to several kilometers is determined by the method of magnetotelluric sounding. The magnetotelluric sounding is conducted by geophysical laboratories having the necessary complete field and laboratory equipment. Several profiles with an interval of several kilometers (a few kilometers to tens of kilometers) apart from each other with a station interval (on the profile) in the first few kilometers will be required for purpose of the present invention. The profiles are drawn together and the stations on the profile are put closer (e.g. within 400 m) in order to increase the accuracy. The results of the magnetotelluric sounding are then analyzed. The final result of the analysis is the cuts where sections with various conductivity are shown (FIG. 1).

3. The magnetic anomalies are local, but very active. They are related to the transitional area from silicides to silicates in the apical part of the finger. They are conditioned by an occurrence of a large quantity of native iron (iron reacts with the latter by silicatization of silicides and so it can remain in its native form).

Figure 2:
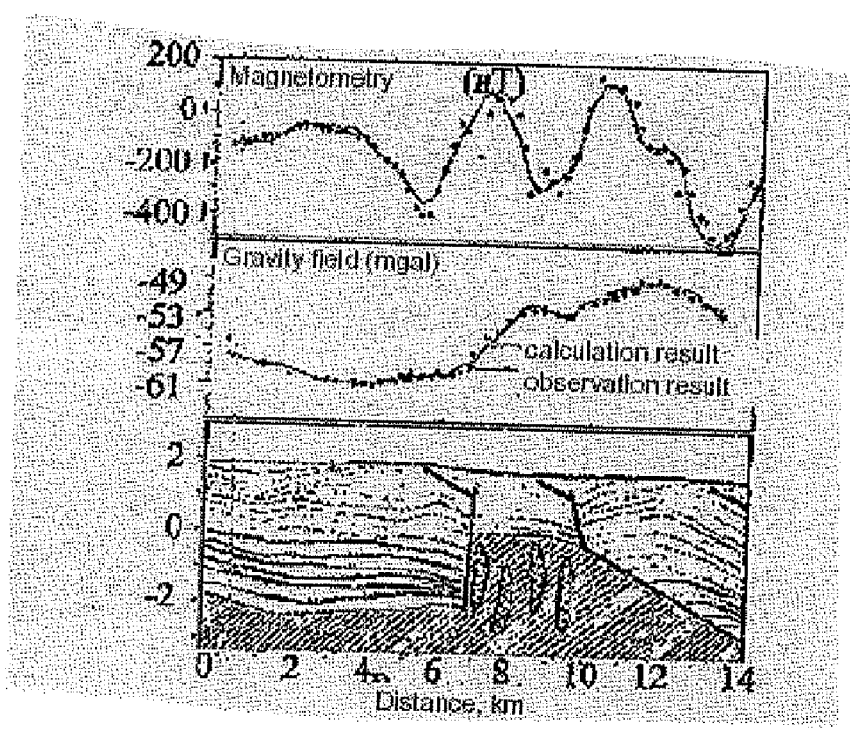
FIG. 2 is an illustration of gavimetric and magnetometric profiles.

Gravimeters and magnetometers are used for the building of gravimetric and magnetometric profiles and charts. The works are carried out by special-purpose laboratories and field crews having necessary skills and equipment. As a rule, observations are made on profiles with the step of 100-200 meters. The station interval in the profile may vary for an increase or reduction of survey minuteness. The location of profiles is selected on the basis of the geological situation. The survey is represented in form of cuts and charts (FIG. 2).

4. Areal volcanism with the feature "yesterday effused, today got cold, now it does not show any signs of hydrothermal activity". The volcanism is not supported by the deep heat and occurs by contact of silicides with shallow water only, what results in warming-up, oxidation of silicides to silicates—occurrence of basalt flux, effusion of the latter, crack healing (on which the effusion occurred) and termination of volcanic and hydrothermal activity. Such observation is made by the inventor of the present invention in the Tunka cavity (Baikal riftzone) and in Idaho (USA).

5. Aseismicity in the regions where silicides (with residual hydrogen dissolved in them) prevail at a small depth. Aseismicity is conditioned by the fact that phases of $Mg_2Si$, FeSi and, possibly, Si, will have increased plasticity beginning from the depth of about 10 km and deeper. The plasticity of hydrogenated metals under pressure is for the first time established by the inventor of the present invention (certificate of authorship No. 1165525). The seismic charts exist. Epicenters and earthquake magnitude for the observation period are shown on these charts. Modern riftzones where earthquakes are seldom and do not have a high magnitude are of interest for application of the present invention.

6. Abnormally low thermal currents in spite of continuing growth of the mountain relief as in the Tunka cavity located in the Baikal riftzone and also in Ridge and Basin Areas in the west of the USA. This is connected with the impossibility of water penetration to the apical parts of fingers, at that, this is obviously caused by permafrost in the Baikal riftzone and by extremely low precipitation (a few millimeters per year) in the west of the USA. The reaction with heat release occurs in the riftzones where water can penetrate up to the fingers of the abnormal mantle and, as a consequence, the thermal current over the riftzone will be increased (as in Iceland).

Figure 3:
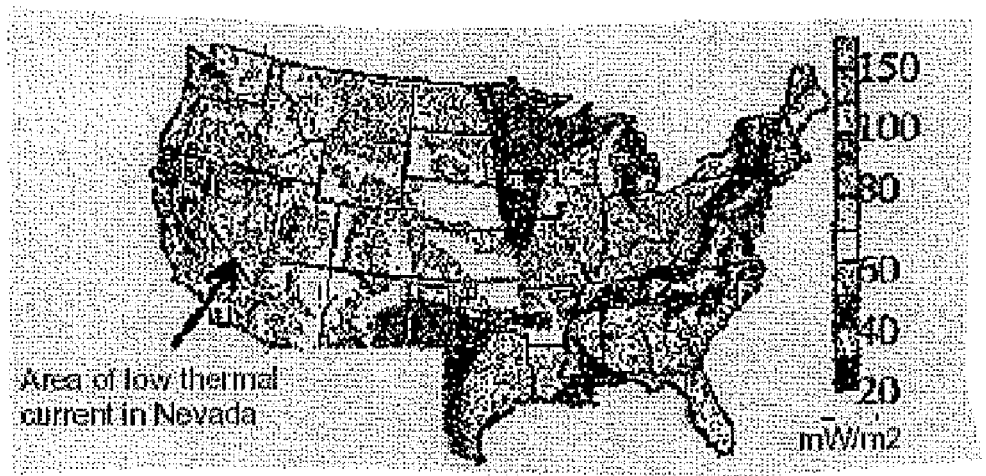
FIG. 3 is an illustration of a chart with parameters of the Earth's thermal current.

Parameters of the thermal current of the Earth are calculated after measurement of a temperature gradient (e.g., in a well) and rock thermal conductivity (FIG. 3). As a rule, it is carried out by specialists in geothermal energy.

7. The existence of large areas of blasted basalts as a result of a shallow blast with cumulative shell-holes with a depth of 10 m and diameter of a 20-30 m (USA, Idaho, Snake River) is possible. Similar structures can also be found in the Baikal riftzone. Silanes ($Si_nH_m$) blast by contact with the atmosphere and form shell-holes, chaotic fall, forest carbonification and atmospheric glow.

8. Strange velocity distribution of seismic waves: the velocity is high in the upper part of diapirs up to the depth of about 12 km (due to the effect of metals' embrittlement because of the dissolved hydrogen), it become notably lower at the larder (i.e. cooler) depths (due to the plasticity effect). In places where modern (today's vulcanites) are present in the top part of the diapir, the velocity is reduced due to the warming-up by melting (and heating) of the apical part of the diapir. Thus, the seismic tomography is able to determine the occurrence depth of silicides with a sufficient accuracy.

Figure 4:
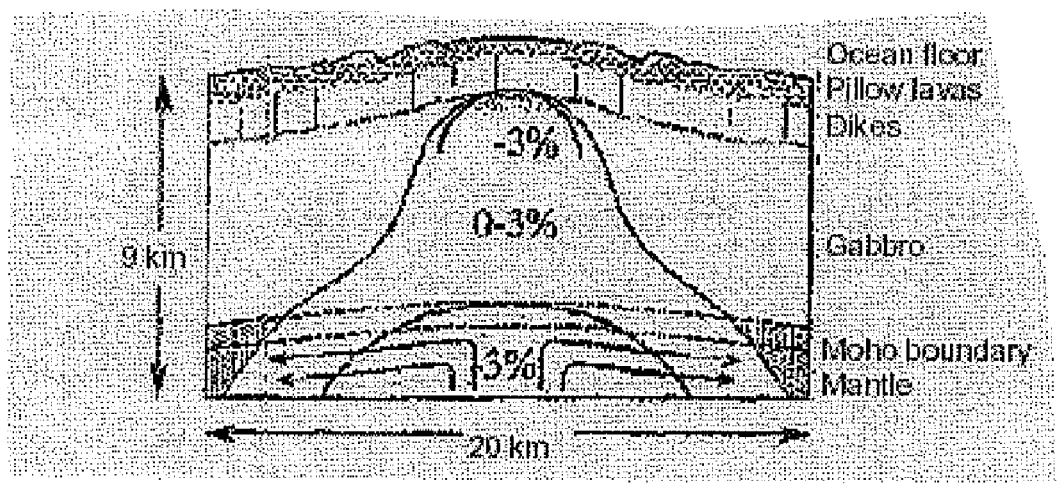
FIG. 4 is an illustration of velocity distribution of seismic waves.

It is expedient to apply a complex of seismic methods for clarification of passing velocity of seismic waves. The reflection method will show the limits of the required object, and the refraction method will show the velocity distribution (of seismic waves) inside of this object. This work package is carried out by special-purpose geophysical laboratories and field crews having necessary complete field and laboratory equipment. Observations are made on profiles, and the methods are selected after a preliminary geologic-geophysical study. In a general case the result of survey are profiles (FIG. 4).

9. Signs of influence of silanes (silanes cannot go far away from diapirs of silicides);

- Mafic minerals containing iron oxides are fully eaten (reaction of type: $SiH_4+2FeO=SiO_2+2Fe+2H_2$). This results in holed round stones of diorites and granodiorites with vugs from mafic minerals, and quartz and feldspar near the vugs are melted and scales of native iron can be seen in the glass.
- Holes in lavas in which soaked xenoliths—pieces of protobase and pyroxenes—are suspended on two-three thin "strings-threads". Iron balls can be found in these holes which are rapidly oxidized under influence of the atmospheric moisture.
- "Inflated" cushions and thick air beds, colored blue and black from inside and reddish-brownish-cream-colored from outside like a well-baked long loaf Pimples—microscopical volcanoes. Namely "inflatable"—slag necks inside (for the most part disconnected). By reactions of type: $SiH_4+2FeO=SiO_2+2Fe+2H_2$—two moles of hydrogen are obtained from one mole of silane gas, i.e. the volume is doubled.
- Marble graphitization. The result of the reaction: $CaCO_3+Si_nH_m=CaSiO_3+C+H_2(+SiO_2)$—at the expense of the reaction of silanes with water and atmosphere). If this reaction occurs not on the surface but under the layer (of overlying rock), then carbon interreacts with hydrogen and various hydrocarbons are formed.
- Native peoples know well that it is possible to be poisoned by fumes of young basalt stones thrown into the fire (as result of reaction of not fully oxidized petrogenic elements with carbon-dioxide gas, e.g. $SiO+CO_2=SiO_2+CO$).

Geological Example

USA, Idaho, Snake River

A huge territory is bedded with modern basalts. The age of the lava in this area can be easily determined based on the character of the natural growth on these basalts. The earlier streams already have soil pockets in some places and accordingly grass and bushes. However, uniform plant cover is absent. The later streams are absolutely bare and have no soil and plant cover. They look so, as if they effused yesterday and only just got cold.

The structure of overwind ropes can be often seen on the surface. Inside of the youngest ropes can be seen toothed air-holes (similar to stalactites and stalagmites). These are the same "inflated" cushions. Sometimes these air-holes can reach up to several meters in diameter.

Extensive territories are represented by slagged lavas in the form of chaotically thrown pieces, clods and blocks. These are sharp-cornered rock and blocks, as if somebody has loosened the effused basalts by small blasts. Saucer-shaped craters with a diameter of up to 15-20 m and a depth of up to 5 m can be observed. The surface of basalts blast-loosened is as a rule about 1-2 meters higher than the surface of unbroken lavas, i.e. loosening was not deep. Probably, this is a result of interreaction of silanes with air oxygen, such as silanes blasted by contact with the atmospheric oxygen. In addition, these blasts most likely occurred on the surface or at a very small depth with the absolute absence of hydrothermal activity: no gurgling and no steam anywhere.

INDUSTRIAL APPLICABILITY

This invention is exercisable, as it is based on the use of well-known technical instrumentation for measurement of physical and chemical nature.

What is claimed is:

1. A method for detecting an occurrence zone of a mantle substance diapir finger comprising the steps of:
    conducting geological observations in geographic regions banked up by diapirs of an abnormal mantle;
    determining candidate places of a location of the mantle substance finger in the earth's crust;
    determining a corresponding ratio of $^3He/^4He$ on the order of $10^{-5}$ from gases sampled from sources at the candidate places, thereby determining the presence of silicides at a small depth as physical parameters for the location of the mantle substance diapir finger in the earth's crust;
    establishing the presence of high semiconductor conductivity, locality and activity of magnetic anomalies and anomalies of gravity field at the candidate places; and
    determining the occurrence zone from the occurrence depth of the silicides using the high semiconductor conductivity, locality and activity of magnetic anomalies, and anomalies of the gravity field.

2. The method of claim 1, further comprising the step of: determining the presence of areal volcanism.

3. The method of claim 1, further comprising the step of: determining the presence of shallow blasting of silanes in form of cumulative shell-holes on the blasted basalts.

4. The method of claim 1, further comprising the step of: determining the presence of low watering of the territory.

5. The method of claim 1, further comprising the step of: determining the presence of low temperature gradients.

6. The method of claim 1, further comprising the step of: determining the presence of aseismicity of the territory.

7. The method of claim 1, wherein the step of determining places of a location of the mantle substance finger in the earth's crust includes the step of:
    determining the presence of influence traces of silane streams upon the rock of the riftzones.

8. The method of claim 1, wherein the step of determining places of a location of the mantle substance finger in the earth's crust includes the step of:
    determining the presence of separate ridges having the length up to 200 km by the width of up to 20 km.

9. The method of claim 1, wherein the step of determining places of a location of the mantle substance finger in the earth's crust includes the step of:

determining the presence of blast traces of silanes.

10. The method of claim 1, wherein the step of determining places of a location of the mantle substance finger in the earth's crust includes the step of:

determining the presence of scoria cones.

11. The method of claim 1, wherein the step of determining the occurrence zone is based on magnetotelluric sounding.

12. The method of claim 1, wherein the step of determining the occurrence zone is based on seismic reflection and refraction methods.

13. An improved detection method of an occurrence zone of a mantle substance diapir finger in which geological observations are carried out in riftzones banked up by diapirs of an abnormal mantle and places of a location of the mantle substance finger in the earth's crust are determined based on the presence of influence traces of silane streams upon the rock and/or the presence of separate ridges having a length up to 200 km by a width of up to 20 km and/or based on blast traces of silanes and/or the presence of scoria cones, the improvement comprising the steps of:

determining a corresponding ratio of $^3He/^4He$ on the order of $10^{-5}$ from gases sampled from sources at the candidate places, thereby determining the presence of silicides at a small depth as physical parameters for the location of the mantle substance diapir finger in the earth's crust;

establishing the presence of high semiconductor conductivity, locality and activity of magnetic anomalies and anomalies of gravity field at the candidate places; and determining the occurrence zone from the occurrence depth of the silicides using the high semiconductor conductivity, locality and activity of magnetic anomalies, and anomalies of the gravity field.

14. The improved method of claim 13, further comprising the step of:

determining the presence of areal volcanism.

15. The improved method of claim 13, further comprising the step of:

determining the presence of shallow blasting of silanes in form of cumulative shell-holes on the blasted basalts.

16. The improved method of claim 13, further comprising the step of:

determining the presence of low watering of the territory.

17. The improved method of claim 13, further comprising the step of:

determining the presence of low temperature gradients.

18. The improved method of claim 13, further comprising the step of:

determining the presence of aseismicity of the territory.

19. The improved method of claim 13, wherein the step of determining places of a location of the mantle substance finger in the earth's crust includes the step of:

determining the presence of influence traces of silane streams upon the rock of the riftzones.

20. The improved method of claim 13, wherein the step of determining the occurrence zone is based on at least one of magnetotelluric sounding and seismic reflection and refraction methods.

* * * * *